United States Patent
Vaccaro et al.

(10) Patent No.: US 6,816,073 B2
(45) Date of Patent: Nov. 9, 2004

(54) AUTOMATIC DETECTION AND MONITORING OF PERIMETER PHYSICAL MOVEMENT

(75) Inventors: Dennis David Vaccaro, Glenview, IL (US); Rodney Max Solina, Algonquin, IL (US)

(73) Assignee: Northrop Grumman Corporation, Woodland Hills, CA (US)

(*) Notice: Subject to any disclaimer, the term of this patent is extended or adjusted under 35 U.S.C. 154(b) by 91 days.

(21) Appl. No.: 10/241,408

(22) Filed: Sep. 11, 2002

(65) Prior Publication Data

US 2004/0046661 A1 Mar. 11, 2004

(51) Int. Cl.$^7$ .............................................. G08B 13/00
(52) U.S. Cl. ...................................... 340/541; 340/564
(58) Field of Search .............................. 340/564, 541, 340/557; 116/5, 6, 7

(56) References Cited

U.S. PATENT DOCUMENTS 6,127,926 A * 10/2000 Dando ........................ 340/541

2003/0020610 A1 * 1/2003 Swanson et al. ............ 340/566

* cited by examiner

Primary Examiner—Jeffery Hofsass
Assistant Examiner—Jennifer Stone
(74) Attorney, Agent, or Firm—Patti & Brill, LLC (57) ABSTRACT

Apparatus in one example comprises first and second fence posts that cooperate to represent a subportion of a perimeter to be secured. The first fence post comprises a first motion sensor and a first laser sensor. The second fence post comprises a second motion sensor and a second laser sensor. Upon physical movement in a region outside the subportion of the perimeter, one or more of the first and second motion sensors serve to automatically perform a detection of the physical movement in the region outside the subportion of the perimeter. Upon the detection of the physical movement in the region outside the subportion of the perimeter the one or more of the first and second motion sensors serve to automatically cause the first and second laser sensors to monitor for physical movement at the subportion of the perimeter.

30 Claims, 5 Drawing Sheets

AUTOMATIC DETECTION AND MONITORING OF PERIMETER PHYSICAL MOVEMENT

TECHNICAL FIELD

The invention relates generally to security and more particularly to intelligent components that provide security of a perimeter.

BACKGROUND

Perimeter security is important to locations such as military installations. The perimeter comprises a property line. The security serves to keep intruders from crossing into the perimeter and residents from unauthorized exit across the perimeter.

One design locates at the perimeter a physical barrier such as a tall (e.g., twelve-foot) chain-link fence topped with razor wire and equipped with embedded sensors such as taut wires or fiber optic cable and accelerometers. The embedded sensors monitor the integrity of the physical barrier. Human operators locate and assess unauthorized violation of the perimeter remotely through use of surveillance cameras discreetly positioned and distributed near the physical perimeter.

The physical fence itself is expensive to install and maintain. Installation of the fence costs upwards of one million dollars per mile. A typical military installation has ten miles of perimeter to secure, which consequently would require upwards of ten million dollars to equip with the fence. To provide the fence at many military bases, the cost reaches billions of dollars. In addition, the requirement for human operators to participate in the surveillance of the perimeter entails further costs.

The fence is excessively-expensive or ineffective in many expected situations. To accomplish nuisance control (e.g., keeping out passers-by such as intoxicated persons) and residential monitoring, the physical fence is excessive for the purpose of deterring wandering, unintended encroachments, or unauthorized leaves. To address terrorist situations or clashes with military operations, the physical fence is ineffective against powerful, sophisticated, and destructive (e.g., explosive or airborne) forces. In addition, the taut wires or fiber optic cable when broken represent a single-point failure for breach of the barrier and violation of the perimeter, leaving open the possibility for a diversionary tactic.

Thus, a need exists for a decrease in consumption of substantial materials for perimeter security. A need also exists for a decrease in requirements for human operator participation in perimeter security. A further need exists for an increase in cost-effectiveness and robustness of measures for dealing with intruder incidents.

SUMMARY

One implementation of the invention encompasses an apparatus. The apparatus in one example comprises a first fence post and a second fence post. The first fence post comprises a first motion sensor and a first laser sensor. The second fence post comprises a second motion sensor and a second laser sensor. The first and second fence posts cooperate to represent a subportion of a perimeter to be secured. Upon physical movement in a region outside the subportion of the perimeter to be secured, one or more of the first and second motion sensors serve to automatically perform a detection of the physical movement in the region outside the subportion of the perimeter to be secured. Upon the detection of the physical movement in the region outside the subportion of the perimeter to be secured the one or more of the first and second motion sensors serve to automatically cause the first and second laser sensors to monitor for physical movement at the subportion of the perimeter to be secured.

Another implementation of the invention encompasses a method. There are distributed at least one processor at a command center and a plurality of processors about a perimeter to be secured. A subset of the plurality of processors comprise first and second processors located in respective first and second fence posts that represent a subportion of the perimeter to be secured. The first and second fence posts comprise respective first and second motion sensors and respective first and second laser sensors. The first motion sensor automatically performs a detection of physical movement in a region outside the subportion of the perimeter to be secured. The first motion sensor automatically communicates an alert signal to the first processor. The first and second laser sensors are automatically caused, by the first processor and in response to the alert signal from the first motion sensor, to monitor for physical movement at the subportion of the perimeter. An alert signal from the first processor is, in response to the alert signal from the first motion sensor, automatically caused to be communicated among the plurality of processors and zero or more of the at least one processor.

DESCRIPTION OF THE DRAWINGS

Features of exemplary implementations of the invention will become apparent from the description, the claims, and the accompanying drawing in which:

DETAILED DESCRIPTION

Figure 1:
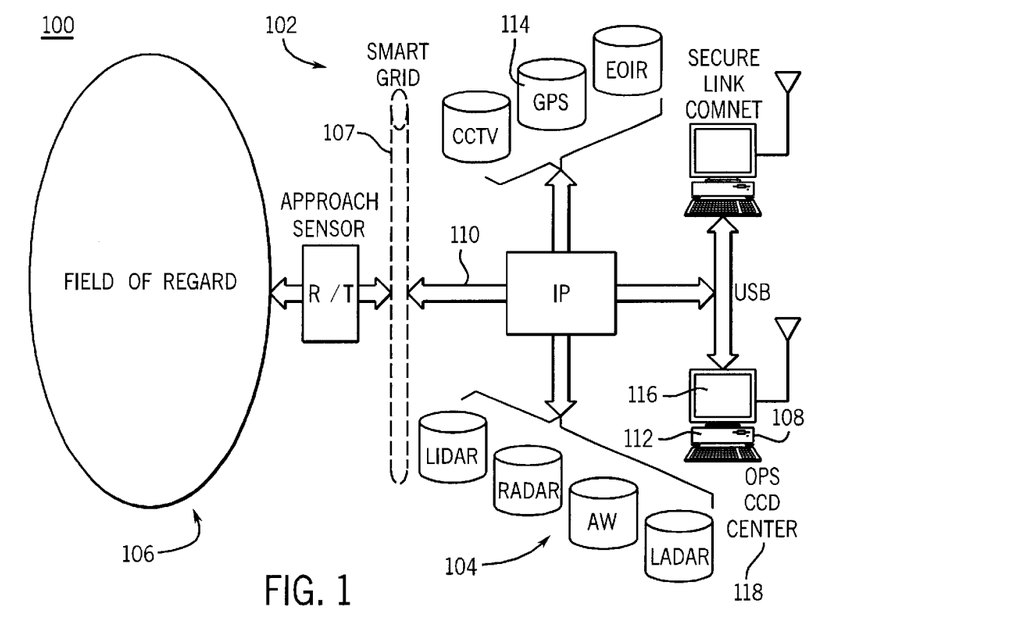
FIG. 1 is a representation of one exemplary implementation of an apparatus that comprises a network, a physical fence, an interior region, and an outside region.

Turning to FIG. 1, an apparatus 100 in one example comprises first and second fence posts that cooperate to represent a subportion of a perimeter to be secured. The first fence post comprises a first motion sensor and a first laser sensor. The second fence post comprises a second motion sensor and a second laser sensor. Upon physical movement in a region outside the subportion of the perimeter to be secured one or more of the first and second motion sensors serve to automatically perform a detection of the physical movement in the region outside the subportion of the perimeter to be secured. Upon the detection of the physical movement in the region outside the subportion of the perimeter to be secured the one or more of the first and second motion sensors serve to automatically cause the first and second laser sensors to monitor for physical movement at the subportion of the perimeter to be secured. The apparatus 100 includes a plurality of components. A number of such components can be combined or divided in the apparatus 100.

Referring to FIG. 1, the apparatus 100 in one example comprises a network 102, a physical fence 202, an interior region 104, and an outside (e.g., exterior) region 106. The network 102 serves to provide primary security for a perimeter marked by the physical fence 202. The embedded sensors of the SP array form the actual security measure. The network 102 comprises an open and modular architecture. The network 102 incorporates embedded intelligence functions through a linked distribution of digital processing components that correlate and integrate sensed data and thereby promote a decrease in requirements for human operator participation in the apparatus 100. The architecture of the network 102 avoids single-point failures by incorporating functional redundancy in the component array along with overlapping coverage.

The network 102 comprises a secure, integrated, smart grid 107 that comprises and is coupled with intelligent components and communication pathways. The network 102 comprises motion (e.g., infrared and/or acoustic) sensors 204 (FIG. 2), laser sensors 502 (FIG. 5), and optical sensors (e.g., optical and/or pan, tilt, and zoom, "PTZ," cameras) 302 (FIG. 3), (e.g., digital) processors 108 and 504 (FIG. 5), communication passages 110, storage devices 112, utilities 114, displays 116, and a central command center 118.

The communication passages 110 support wireless and wired communication. The communication passages 110 support standards such as internet protocol ("IP") and universal serial bus ("USB"). The central command center 118 comprises one or more of the processors 108. The central command center 118 comprises command, control and display ("CCD"), operations ("OPS"), and communications network ("COMNET") capabilities.

The storage devices 112 comprise memory for running of computer software applications. The utilities 114 comprise closed circuit television ("CCTV"), global positioning system ("GPS"), electro-optical infrared ("EOIR"), light detection and ranging ("LIDAR"), radio detection and ranging ("RADAR"), acoustic weapon ("AW"), and laser detection and ranging ("LADAR").

Figure 2:
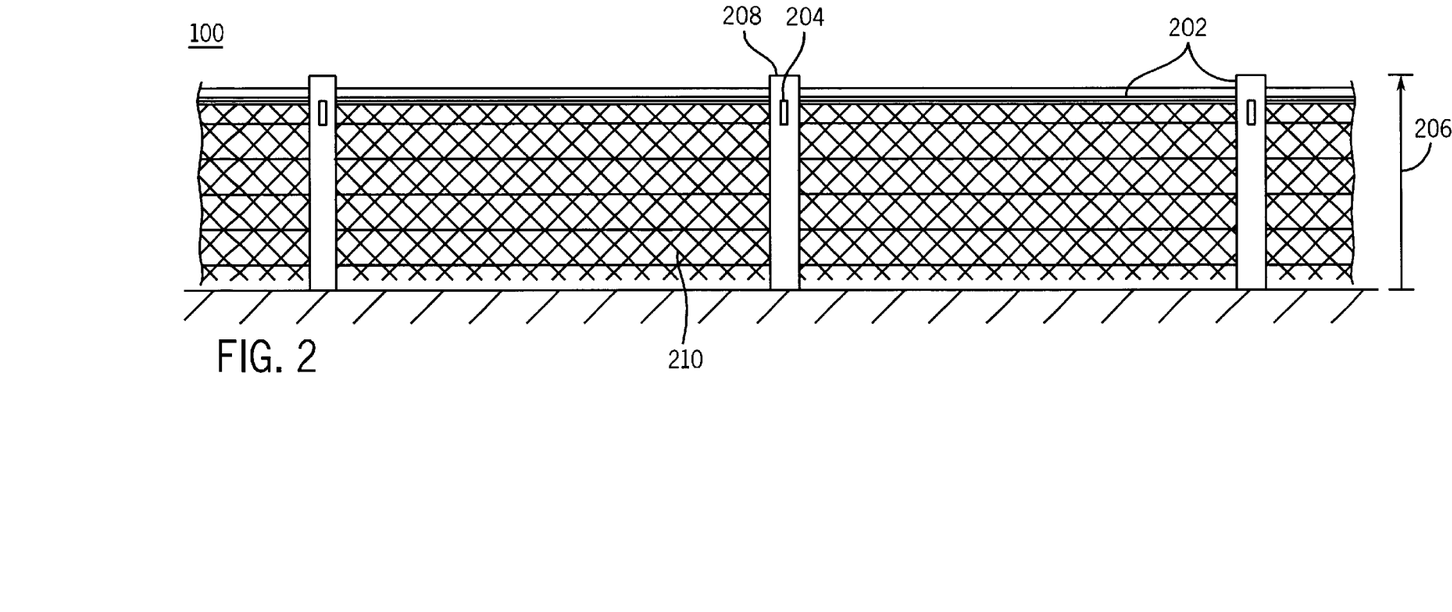
FIG. 2 is an enlarged, front representation of a subportion of the network and the physical fence of the apparatus of FIG. 1.
Figure 5:
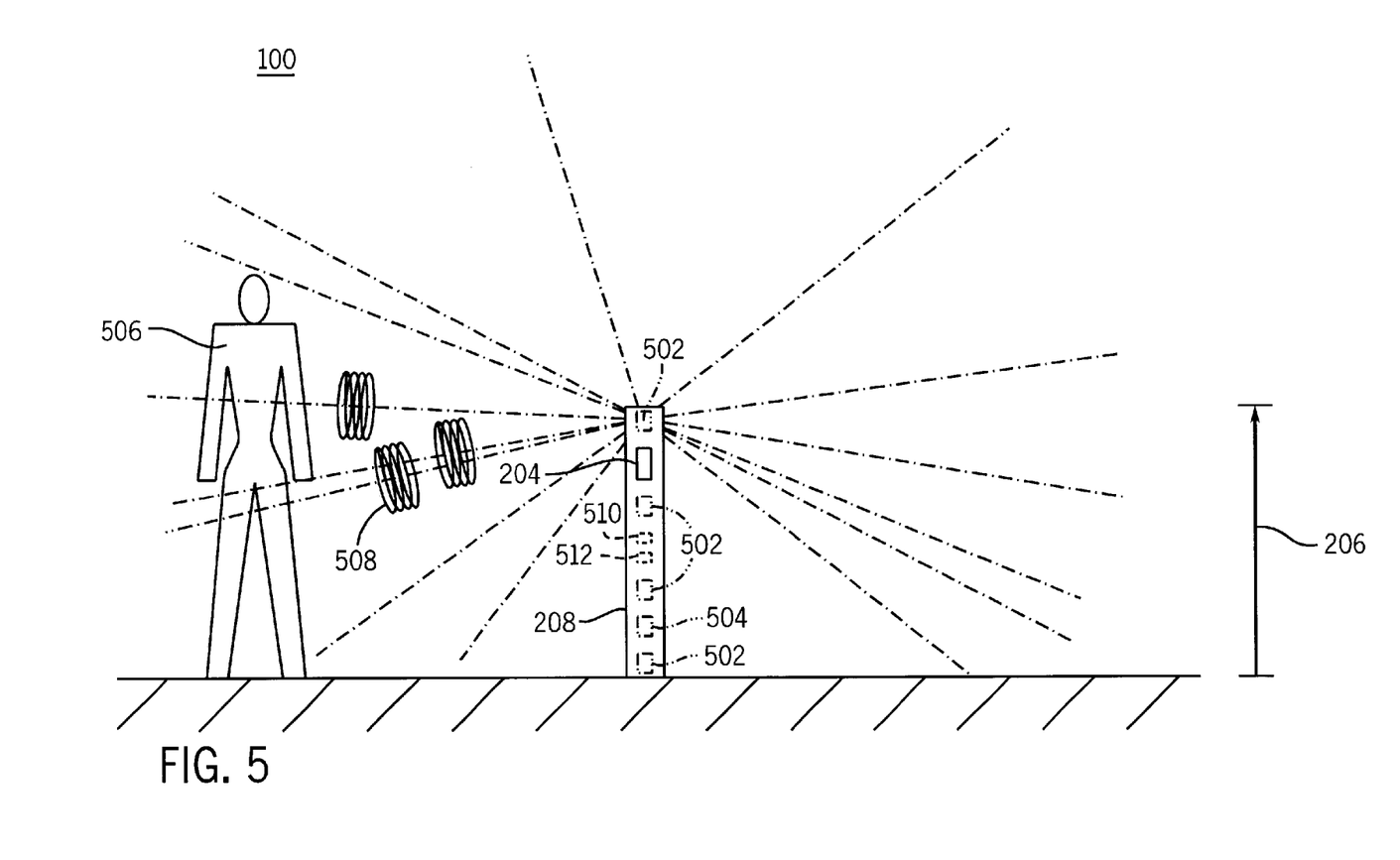
FIG. 5 is an enlarged, side representation of a fence post of the physical fence of the apparatus of FIG. 1, illustrating one example of sensor detection of an intruder.
Figure 6:
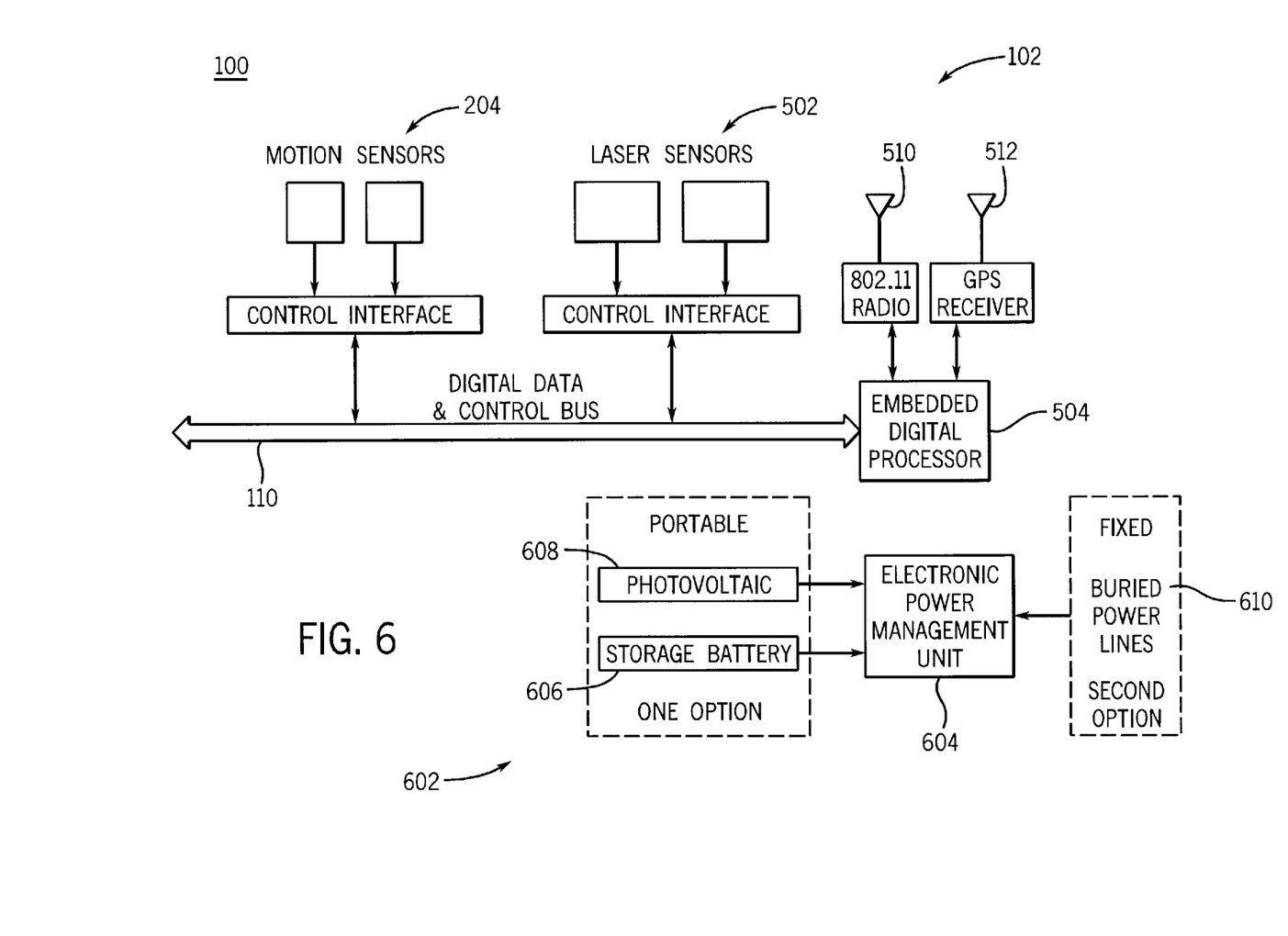
FIG. 6 is a representation of motion sensors, laser sensors, a processor, a radio, a receiver, a communication passage, and a power source of the network and a fence post of the physical fence of the apparatus of FIG. 1.

Referring to FIGS. 2 and 5-6, the physical fence 202 marks and/or visually indicates the perimeter. The physical fence 202 promotes avoidance of false alarms due to non-threat incidents such as intrusion by a lost tourist or small animal. A height 206 of the physical fence 202 is relatively modest since the motion sensors 204, the laser sensors 502, and the processors 504, rather than the structure of the physical fence 202, effect the predominant security measure of the physical fence 202, as described herein. For example, the height 206 of the physical fence 202 is between 0.5 and 1.5 meters.

The physical fence 202 comprises fence posts 208 and chain-links 210 supported thereby. In another example, the physical fence 202 comprises any type of fence suitable for a particular application. The fence posts 208 cooperate in representation of the perimeter to be secured. The fence post 208 comprises a framework to which components of electronic equipment are attached and/or supported. For example, the fence post 208 comprises a chassis. The fence post 208 houses one or more of the motion sensors 204, one or more of the laser sensors 502, and one or more of the processors 504. The motion sensors 204, the laser sensors 502, and the processors 504 housed in the fence posts 208 comprise the smart grid 107.

In addition, the fence post 208 comprises a receiver 510, a (e.g., 802.11 standard) radio 512, and a power source 602. The receiver 510 in one example comprises a global positioning system ("GPS") receiver such as for self-location by the receiver 510. The radio 512 in one example serves to allow two-way communication over a wireless network. The self-location and communication capabilities of the smart grid 107 allows for self-configuration of a perimeter defense deployment in a portable application. In a further example, portable implementations of the fence posts 208 can serve as a repair mechanism for failed instances of the fence posts 208 in a fixed installation. The ability to self-configure presents additional advantages in such a repair situation, as will be appreciated by those skilled in the art.

For portable applications, an array of the fence posts 208 function as a self-configuring and self-locating wireless network. In one example, the fence post 208 is bottom-weighted and capable of temporary anchoring or embedding in the ground to allow for movement of the perimeter over time. In another example, the fence post 208 is permanently installed to suit a particular situation. In some portable applications, the power source 602 comprises an electronic power management unit 604, a storage battery 606, and a photovoltaic array 608. In some fixed applications, the power source 602 comprises the electronic power management unit 604 and one or more (e.g., buried) power lines 610.

An illustrative description of exemplary operation of the apparatus 100 is now presented, for explanatory purposes.

Figure 3:
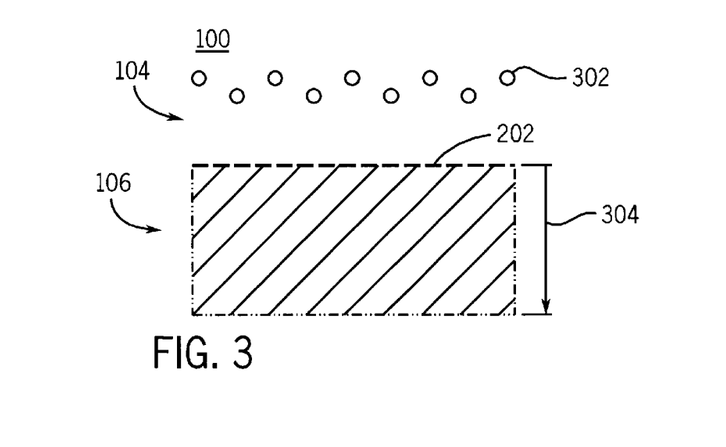
FIG. 3 is top representation of a subportion of the network, the physical fence, the interior region, and the exterior region of the apparatus of FIG. 1.

One or more objects (e.g., vehicles or persons) 506 intruding into the outside region 106 first triggers the motion sensors 204 that comprise the smart grid 107. The motion sensors 204 define the outside region 106. The laser sensors 502 serve to detect a breach of the perimeter at the physical fence 202. In operation, the motion sensor 204 provides an initial warning of a potential intruder within the outside region 106. The warning triggers a preliminary alert, for example, a first-level alert and track response that activates the laser sensors 502 located locally to the potential intruder. The laser sensors 502 activate are embedded in a few of the fence posts 208 located near the point of intrusion. The warning also triggers the optical sensors 302. The optical sensors 302 permit personnel in the command center 118 to examine the incident in real-time. Security or law enforcement personnel located at the command center 118 examine the displayed real-time, optical image and determine whether the object 506 is in fact a threat. The command center 118 is located some distance away (e.g., remote) from the physical fence 202. After examination, a response by security personnel may be undertaken.

The motion sensors 204 serve to provide alert far in advance of an actual incident by establishing the outside region 106. Upon physical movement in the outside region 106, one or more of the motion sensors 204 serve to automatically perform a detection of the physical movement. In addition, the motion sensors 204 automatically communicate an alert signal to one or more of the processors 504. In one example, the motion sensor 204 communicates the alert signal to one of the processors 504 and in response thereto, the one of the processors 504 automatically communicates an alert signal to another one of the processors 504, for example, located proximate to the detected physical movement in the outside region 106.

Figure 4:
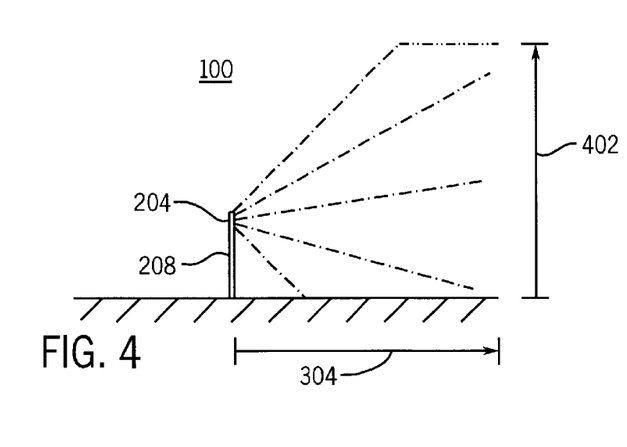
FIG. 4 is side representation of a subportion of the network, the physical fence, the interior region, and the exterior region of the apparatus of FIG. 1.

The outside region 106 in one example comprises a warning zone that extends a distance 304 of a few hundred meters outward from the line of the physical fence. In a further example, the warning zone of the outside region 106 extends a distance 402 of eight meters above ground.

Referring to FIGS. 2, 5–6, and 8, objects 506 entering the outside region 106 automatically trigger the first-level alert and track response involving nearby ones of the laser sensors 502 and the optical sensors 302. Upon their detection of the physical movement in the outside region 106, the motion sensors 204 serve to automatically cause the nearby ones of the laser sensors 502 to monitor for physical movement at the subportion of the perimeter to be secured proximate to the detected physical movement in the outside region 106.

Figure 8:
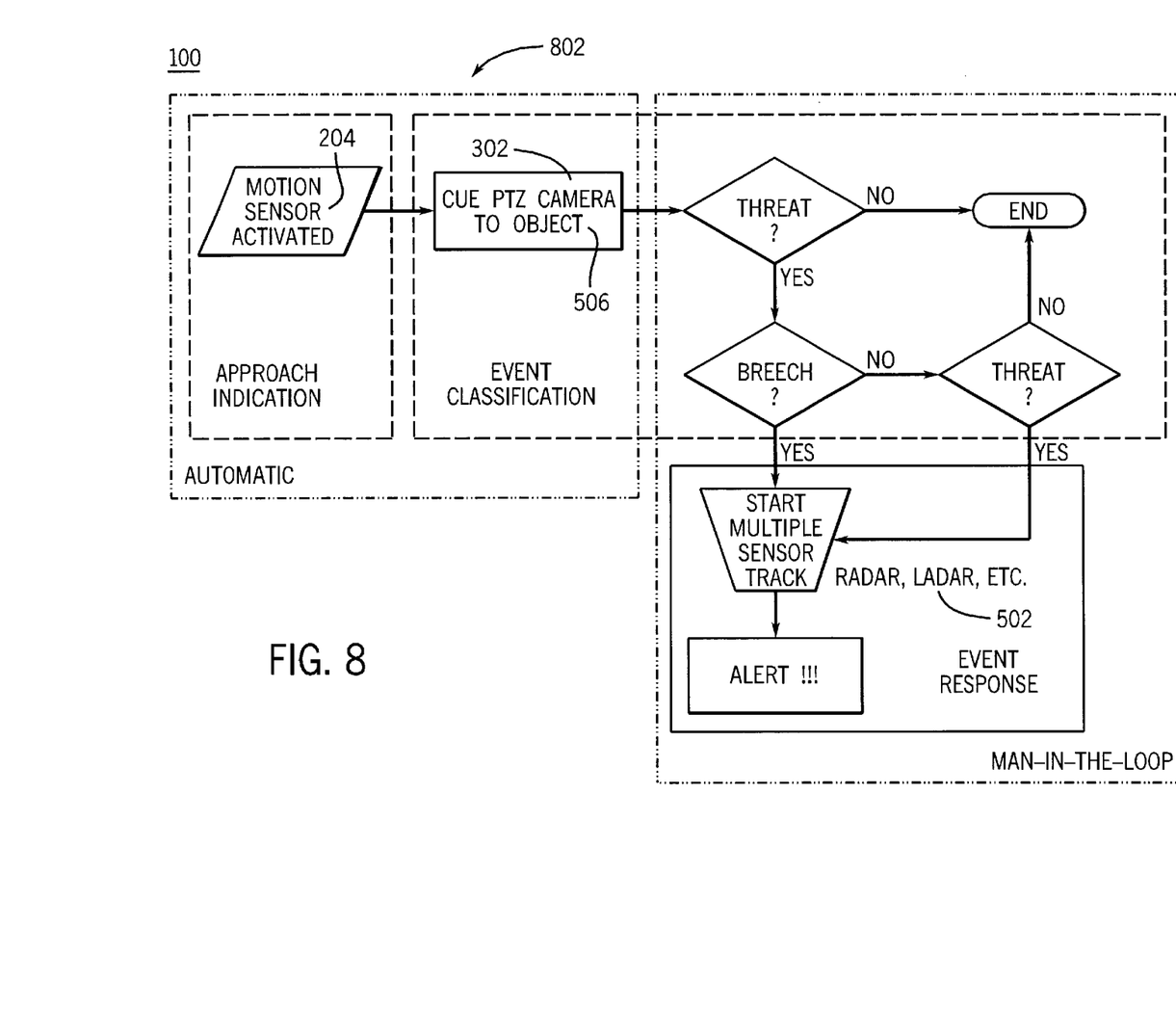
FIG. 8 is a representation of exemplary logic employable with the apparatus of FIG. 1.

The processors 504, in response to the alert signal from the motion sensors 204, automatically cause activation of the laser sensors 502 to monitor for the physical movement at the perimeter. In a further example, the second processor 504 in response to the alert signal from the first processor 504 automatically causes activation of another one or more of the laser sensors 502 to monitor for the physical movement at the subportion of the perimeter to be secured. In a still further example, the first-level alert and track response additionally involves activation of one or more of the utilities 114. The laser sensors comprise are embedded in series in the physical fence 202 to create a virtual barrier wall or planar grid of light beams, which when breached by the object 506 activates a second-level alert and track involving additional ones of the laser sensors 502 and the utilities 114. Logic 802 represents one example of the first and second levels of the alert and track response.

The motion sensors 204 are embedded in the fence posts 208 and look outward from the physical fence 202 to define the outside region 106. The fence posts 208 are located at regular intervals along the physical fence 202 so as to provide a uniform zone of warning coverage. The motion sensors 204 provide warning or alert far in advance of an actual breaching incident by establishing the outside region 106. The objects 506 entering the outside region 106 automatically trigger the first-level alert and track response (e.g., as a hand-off) involving activation of one or more of the laser sensors 502, the optical sensors 302, and the utilities 114.

The laser sensors 502 form a zone of uniform coverage and establish a virtual barrier or wall, which when breeched by the object 506 activates the second-level alert and track response. The laser sensors 502 form a dense, spider-web-like, virtual wall of invisible light beams in a continuous grid along the interior surface of the physical fence 202. Each of the laser sensors 502 contains a laser source that generates pulsed-light at invisible wavelengths (e.g., 1300 to 1500 nanometers), and a laser detector that coherently detects any light energy reflections 508 from the object 506 crossing or penetrating the virtual wall of invisible light beams. When the motion sensor 204 is triggered, only the laser sensors 502 in subportions of the physical fence 202 located adjacent to the triggered motion sensor 204 are automatically activated.

Figure 7:
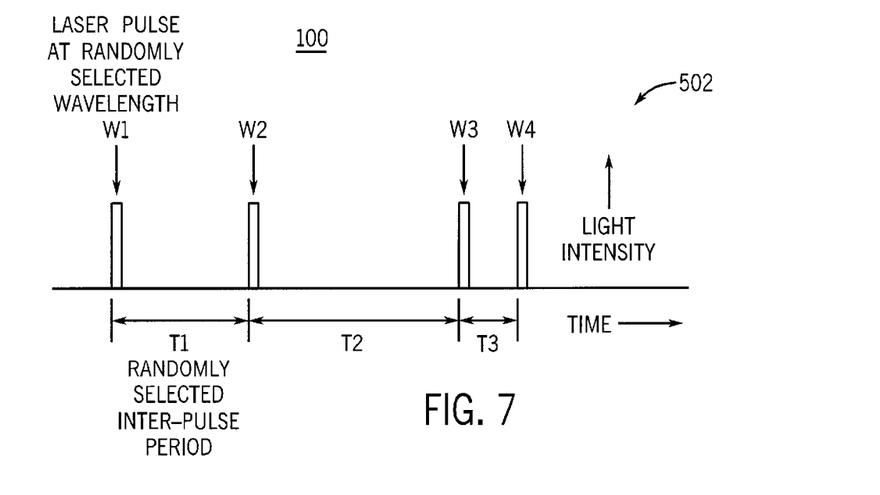
FIG. 7 is a representation of non-regular pulsation, wavelength, and spatial orientation of light emission from a laser sensor of the network and a fence post of the physical fence of the apparatus of FIG. 1.

Referring to FIGS. 5 and 7, to prevent effective employment of countermeasures by the intruder(s), light emitted from the laser sensor 502 has non-regular pulsation, wavelength, and spatial orientation. For example, the laser sensors 502 are pulsed randomly in time at some average rate, and the actual wavelength of the light emitted during a given pulse is also randomly selected from some prescribed range. The spatial orientation of the emitted light beam in the plane of the virtual wall is also random, again to minimize the effectiveness of any potential countermeasures. Generation of a light beam with a varying spatial orientation in one example is accomplished by a rotating mirror mechanism, as will be appreciated by those skilled in the art.

The total expanse of the virtual wall or plane coverage is determined by a number of factors. Two exemplary factors are the physical spacing of the adjacent and active ones of the laser sensors 502 and the range of the laser sensors 502. The length of the perimeter and, correspondingly, of the virtual wall may run a few hundred meters. The laser sensors 502 can locate the object at the crossing point with precision on the order of centimeters, by measuring the time delay and arrival angle of the pulse echo, as will be appreciated by those skilled in the art.

The processors 108 and 504 are distributed among the command center and the perimeter to be secured. The laser sensors 502 are distributed about the perimeter to allow continuous and complete coverage of the perimeter to be secured. Any one or more of the laser sensors 502 are contemporaneously activatable. Automatic communication among the processors 108 and/or 504, in response to one or more alert signals from one or more of the processors 504, serves to cause automatic activation of at least a majority of (e.g., all) a subset of laser sensors 502 located relatively near a subportion of the perimeter to be secured, in a region outside which physical movement has been detected, for example, in a subportion of the outside region 106 proximate to the subportion of the perimeter to be secured. In a further example, automatic communication among the processors 108 and/or 504, in response to one or more alert signals from one or more of the processors 504, serves to cause automatic activation of at least a majority of (e.g., all) subsets of laser sensors 502 located relatively near subportions of the perimeter to be secured, in regions outside which corresponding physical movements have been detected.

Upon a detection by a first laser sensor 502 of physical movement at the subportion of the perimeter to be secured, the first laser sensor 502 automatically communicates an alert signal to a first processor 504. The first processor 504 in response to the alert signal from the first laser sensor 502 automatically communicates an alert signal to the central command center 118. Upon a detection by a first laser sensor 502 of physical movement at the subportion of the perimeter to be secured, the first laser sensor 502 automatically causes communication of an alert signal to the central command center 118. One or more human operators are located at the central command center 118.

The optical sensors 302 comprise one or more cameras located within the perimeter to be secured. At least one of the cameras is directable toward the subportion of the perimeter to be secured. Upon the physical movement in the region outside the subportion of the perimeter to be secured, the first motion sensor automatically causes activation of one or more of the cameras. Upon the activation, the camera serves to allow one or more human operators (e.g., located at the central command center 118) to remotely and visually monitor any one or more physical movements in the region outside the subportion of the perimeter to be secured and/or at the subportion of the perimeter to be secured. Upon the physical movement in the region outside the subportion of the perimeter to be secured, the first motion sensor automatically causes the camera to be directed toward the subportion of the perimeter to be secured and automatically causes the activation of the camera.

In one example, upon a determination by a first processor 504 of security at the subportion of the perimeter to be secured and/or in the region outside the subportion of the perimeter to be secured, the first processor 504 automatically communicates a security determination signal to a second processor 504. In another example, a determination by the processors 504 and/or 108 of security at the subportion of the perimeter and/or in the region outside the subportion of the perimeter automatically causes deactivation of at least a majority of (e.g., all) a subset of the laser sensors 502 located relatively near the subportion of the perimeter to be secured.

A determination by one or more of a human operator, one or more the processors 504, and zero or more of the processor 108, of security at the subportion of the perimeter to be secured and/or in the region outside the subportion of the perimeter to be secured causes deactivation of the at least the majority of (e.g., all) the subset of the laser sensors 502 located relatively near the subportion of the perimeter to be secured.

Upon first and second physical movements in the region outside the subportion of the perimeter to be secured one or more of the motion sensors serve to automatically perform a detection of the first and second physical movements in the region outside the subportion of the perimeter to be secured. Upon the detection of the first and second physical movements, the motion sensors serve to automatically cause the laser sensors 502 located relatively nearby to be secured. In one example, the motion sensors and/or the laser sensors 502 are located in a pair of fence posts 208 near the first and second physical movements. In another example, the motion sensors and/or the laser sensors 502 are distributed among three of more fence posts 208 near the first and second physical movements.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
  a first fence post that comprises a first motion sensor and a first laser sensor; and
  a second fence post that comprises a second motion sensor and a second laser sensor;
  wherein the first and second fence posts cooperate to represent a subportion of a perimeter to be secured;
  wherein the first and the second laser sensors are inactive until a detection of physical movement by one or more of the first and second motion sensors;
  wherein upon physical movement in a region outside the subportion of the perimeter to be secured the one or more of the first and second motion sensors servo to automatically perform a detection of the physical movement in the region outside the subportion of the perimeter to be secured;
  wherein upon the detection of the physical movement in the region outside the subportion of the perimeter to be secured the one or more of the first and second motion sensors serve to automatically activate the first and second laser sensors and cause the first and second laser sensors to monitor for physical movement at the subportion of the perimeter to be secured.

2. The apparatus of claim 1, wherein the first and second fence posts comprise respective first and second processors;
  wherein upon the physical movement in the region outside the subportion of the perimeter to be secured the first motion sensor automatically communicates an alert signal to the first processor, wherein the first processor in response to the alert signal from the first motion sensor automatically causes activation of the first laser sensor to monitor for the physical movement at the subportion of the perimeter to be secured.

3. The apparatus of claim 2, wherein the first processor in response to the alert signal from the first motion sensor automatically communicates an alert signal to the second processor;
  wherein the second processor in response to the alert signal from the first processor automatically causes activation of the second laser sensor to monitor for the physical movement at the subportion of the perimeter to be secured.

4. The apparatus of claim 3, wherein upon a determination by the first processor of security at the subportion of the perimeter to be secured and/or in the region outside the subportion of the perimeter to be secured the first processor automatically causes deactivation of the first laser sensor from monitoring for the physical movement at the subportion of the perimeter to be secured.

5. The apparatus of claim 3, wherein upon a determination by the first processor of security at the subportion of the perimeter to be secured and/or in the region outside the subportion of the perimeter to be secured the first processor automatically communicates a security determination signal to the second processor.

6. The apparatus of claim 2, wherein upon a detection by the first laser sensor of the physical movement at the subportion of the perimeter to be secured the first laser sensor automatically communicates an alert signal to the first processor, wherein the first processor in response to the alert signal from the first laser sensor automatically communicates an alert signal to a central command center.

7. The apparatus of claim 1, further comprising:
  one or more cameras located within the perimeter to be secured, at least one camera of the one or more cameras directable toward the subportion of the perimeter to be secured;
  wherein upon the physical movement in the region outside the subportion of the perimeter to be secured the first motion sensor automatically causes activation of one or more of the at least one camera of the one or more cameras directable toward the subportion of the perimeter to be secured.

8. The apparatus of claim 7, wherein upon the activation by the first motion sensor the one or more of the at least one camera of the one or more cameras serves to allow one or more human operators to remotely and visually monitor any one or more of the physical movement in the region outside the subportion of the perimeter to be secured and the physical movement at the subportion of the perimeter to be secured.

9. The apparatus of claim 8, further comprising a central command center, wherein at least one of the one or more human operators is located at the central command center;
   wherein upon a detection by the first laser sensor of the physical movement at the subportion of the perimeter to be secured the first laser sensor automatically causes communication of an alert signal to the central command center.

10. The apparatus of claim 7, wherein upon the physical movement in the region outside the subportion of the perimeter to be secured the first motion sensor automatically causes the one or more of the at least one camera of the one or more cameras to be directed toward the subportion of the perimeter to be secured and automatically causes the activation of the one or more of the at least one camera of the one or more cameras.

11. The apparatus of claim 1, further comprising a distributed network that comprises at least one processor located at a command center and a plurality of processors located about the perimeter to be secured, wherein a subset of the plurality of processors comprise first and second processors located in the first and second fence posts, respectively;
   wherein upon the physical movement in the region outside the subportion of the perimeter to be secured the first motion sensor automatically performs the detection of the physical movement in the region outside the subportion of the perimeter to be secured and automatically communicates an alert signal to the first processor, wherein the first processor in response to the alert signal from the first motion sensor automatically causes communication of an alert signal among the plurality of processors.

12. The apparatus of claim 11 in combination with a plurality of laser sensors that are distributed about the perimeter to allow continuous and complete coverage of the perimeter to be secured, wherein any one or more of the plurality of laser sensors are contemporaneously activatable, wherein a subset of the any one or more of the plurality of laser sensors are located near the subportion of the perimeter to be secured, wherein the subset of the any one or more of the plurality of laser sensors comprise the first and second laser sensors;
   wherein automatic communication among the plurality of processors in response to the alert signal from the first processor automatically causes activation of at least a majority of the subset of the any one or more of the plurality of laser sensors.

13. The apparatus of claim 12, wherein automatic communication among the plurality of processors in response to the alert signal from the first processor automatically causes activation of all the subset of the any one or more of the plurality of laser sensors.

14. The apparatus of claim 12, wherein a determination, by one or more of the plurality of processors, of security at the subportion of the perimeter and/or in the region outside the subportion of the perimeter automatically causes deactivation of the at least the majority of the subset of the any one or more of the plurality of laser sensors.

15. The apparatus of claim 12, wherein a determination, by one or more of a human operator and one or more of the plurality of processors, of security at the subportion of the perimeter to be secured and/or in the region outside the subportion of the perimeter to be secured causes deactivation of the at least the majority of the subset of the any one or more of the plurality of laser sensors.

16. The apparatus of claim 1, wherein the physical movement in the region outside the subportion of the perimeter to be secured comprises first physical movement in the region outside the subportion of the perimeter to be secured, wherein the physical movement at the subportion of the perimeter to be secured comprises first physical movement at the subportion of the perimeter to be secured;
   wherein upon second physical movement in the region outside the subportion of the perimeter to be secured one or more of the first and second motion sensors serve to automatically perform a detection of the second physical movement in the region outside the subportion of the perimeter to be secured;
   wherein upon the detection of the second physical movement in the region outside the subportion of the perimeter to be secured the one or more of the first and second motion sensors serve to automatically cause the first and second laser sensors to monitor for second physical movement at the subportion of the perimeter to be secured.

17. The apparatus of claim 1, wherein the subportion of the perimeter to be secured comprises a first subportion of the perimeter to be secured, wherein the first fence post comprises a third laser sensor, the apparatus further comprising:
   a third fence post that comprises a third motion sensor and a fourth laser sensor;
   wherein the first and third fence posts cooperate to represent a second subportion of the perimeter to be secured;
   wherein upon physical movement in a region outside the second subportion of the perimeter to be secured one or more of the first and third motion sensors serve to automatically perform a detection of the physical movement in the region outside the second subportion of the perimeter to be secured;
   wherein upon the detection of the physical movement in the region outside the second subportion of the perimeter to be secured the one or more of the first and third motion sensors serve to automatically cause the third and fourth laser sensors to monitor for physical movement at the second subportion of the perimeter to be secured.

18. A method, comprising the steps of:
   distributing at least one processor at a command center and a plurality of processors about a perimeter to be secured, wherein a subset of the plurality of processors comprise first and second processors located in respective first and second fence posts that represent a subportion of the perimeter to be secured, wherein the first and second fence posts comprise respective first and second motion sensors and respective first and second laser sensors;
   automatically performing, by the first motion sensor, a detection of physical movement in a region outside the subportion of the perimeter to be secured;
   automatically communicating an alert signal from the first motion sensor to the first processor;
   automatically causing, by the first processor and in response to the alert signal from the first motion sensor, the first and second laser sensors to change from an inactive state to an active state and monitor for physical movement at the subportion of the perimeter; and automatically causing, in response to the alert signal from the first motion sensor, an alert signal from the first processor to be communicated among the plurality of processors.

19. The method of claim 18, further comprising the steps of:

distributing a plurality of laser sensors about the perimeter to allow continuous and complete coverage of the perimeter to be secured, wherein any one or more of the plurality of laser sensors are contemporaneously activatable, wherein a subset of the any one or more of the plurality of laser sensors are located relatively near the subportion of the perimeter to be secured, wherein the subset of the any one or more of the plurality of laser sensors comprise the first and second laser sensors; and automatically communicating, in response to the alert signal from the first processor, among the plurality of processors to cause automatic activation of at least a majority of the subset of the any one or mare of the plurality of laser sensors.

20. The method of claim 18, further comprising the steps of:

distributing a plurality of laser sensors about the perimeter to allow continuous and complete coverage of the perimeter to be secured, wherein any one or more of the plurality of laser sensors are contemporaneously activatable, wherein a subset of the any one or more of the plurality of laser sensors are located relatively near the subportion of the perimeter to be secured, wherein the subset of the any one or more of the plurality of laser sensors comprise the first and second laser sensors; and automatically communicating, in response to the alert signal from the first processor, among the plurality of processors to cause automatic activation of all the subset of the any one or more of the plurality of laser sensors.

21. The apparatus of claim 1, wherein, upon the physical movement in the region outside the subportion of the perimeter to be secured, the first and second motion sensors send an initial warning of a potential intruder to the first and second laser sensors before the potential intruder crosses into the perimeter to be secured;

wherein the first and second laser sensors activate upon receipt of the initial warning of the potential intruder to monitor for physical movement at the subportion of the perimeter to be secured.

22. The apparatus of claim 21, wherein the region outside the subportion of the perimeter to be secured comprises a region that extends a few hundred meters outward from the subportion of the perimeter to be secured.

23. The apparatus of claim 11, wherein the first processor in response to the alert signal from the first motion sensor automatically causes communication of the alert signal among the plurality of processors and one or more of the at least one processor.

24. The apparatus of claim 12, wherein automatic communication among the plurality of processors and one or more of the at least one processor in response to the alert signal from the first processor automatically causes the activation of the at least the majority of the subset of the any one or more of the plurality of laser sensors.

25. The apparatus of claim 12, wherein automatic communication among the plurality of processors and one or more of the at least one processor in response to the alert signal from the first processor automatically causes the activation of all the subset of the any one or more of the plurality of laser sensors.

26. The apparatus of claim 14, wherein the plurality of processors and one or more of the at least one processor make the determination of security at the subportion of the perimeter and/or in the region outside the subportion of the perimeter.

27. The apparatus of claim 15, wherein the one or more of the human operator, the one or more of the plurality of processors, and one or more of the at least one processor make the determination of security at the subportion of the perimeter to be secured and/or in the region outside the subportion of the perimeter to be secured.

28. The method of claim 18, wherein the step of automatically causing, in response to the alert signal from the first motion sensor, the alert signal from the first processor to be communicated among the plurality of processors comprises the step of:

automatically causing, in response to the alert signal from the first motion sensor, the alert signal from the first processor to be communicated among the plurality of processors and one or more of the at least one processor.

29. The method of claim 19, wherein the step of automatically communicating, in response to the alert signal from the first processor, among the plurality of processors to cause automatic activation of at least a majority of the subset of the any one or more of the plurality of laser sensors comprises the step of:

automatically communicating, in response to the alert signal from the first processor, among the plurality of processors and one or more of the at least one processor to cause automatic activation of the at least the majority of the subset of the any one or more of the plurality of laser sensors.

30. The method of claim 20, wherein the step of automatically communicating, in response to the alert signal from the first processor, among the plurality of processors to cause the automatic activation of all the subset of the any one or more of the plurality of laser sensors comprises the step of:

automatically communicating, in response to the alert signal from the first processor, among the plurality of processors and one or more of the at least one processor to cause automatic activation of all the subset of the any one or more of the plurality of laser sensors.

* * * * *